US008584939B2

(12) United States Patent
Ott et al.

(10) Patent No.: US 8,584,939 B2
(45) Date of Patent: Nov. 19, 2013

(54) MERCHANDISE DISPLAY SYSTEMS FOR LIGHTING CONTROL DEVICES

(75) Inventors: Robert Scott Ott, Perkasie, PA (US); Eric Alan McCoy, Crystal Lake, IL (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 1179 days.

(21) Appl. No.: 12/118,433

(22) Filed: May 9, 2008

(65) Prior Publication Data

US 2009/0278787 A1 Nov. 12, 2009

(51) Int. Cl.
*G06K 19/00* (2006.01)

(52) U.S. Cl.
USPC .......................................... 235/383; 235/375

(58) Field of Classification Search
USPC ................................................. 235/375–385
See application file for complete search history.

(56) References Cited

U.S. PATENT DOCUMENTS 5,250,789 A 10/1993 Johnsen
5,463,286 A * 10/1995 D'Aleo et al. ................ 315/295
5,859,414 A 1/1999 Grimes et al.
6,012,051 A 1/2000 Sammon, Jr. et al.
6,024,281 A 2/2000 Shepley
6,179,206 B1 1/2001 Matsumori
6,430,541 B1 8/2002 Brown et al.
6,434,530 B1 8/2002 Sloane et al.
6,552,663 B2 4/2003 Swartzel et al.
6,604,681 B1 8/2003 Burke et al.
6,641,037 B2 11/2003 Williams
6,646,659 B1 11/2003 Brown et al.
6,687,712 B2 2/2004 Mito et al.
6,813,341 B1 11/2004 Mahoney
6,820,062 B1 11/2004 Gupta et al.
6,844,821 B2 1/2005 Swartzel et al.
6,868,392 B1 3/2005 Ogasawara
7,268,780 B2 * 9/2007 Shibano ........................ 345/426
7,394,451 B1 7/2008 Patten et al.
2001/0052001 A1 12/2001 Stern
2002/0065714 A1 5/2002 Goodwin, III
2002/0079368 A1 6/2002 Hankins
2002/0139846 A1 10/2002 Needham et al.
2002/0139847 A1 10/2002 Goodwin, III
2003/0110095 A1 6/2003 Danenberg
2003/0115113 A1 6/2003 Duncan
2003/0171997 A1 9/2003 Eaton
2004/0103031 A1 5/2004 Weinschenk
2007/0096903 A1 * 5/2007 Hibshman et al. ............ 340/540
2008/0136356 A1 * 6/2008 Zampini et al. ............... 315/308

OTHER PUBLICATIONS

Create the Experience, Market Builders Merchandising, 2008, Lutron, Sep. 2007, 12 pages.

(Continued)

*Primary Examiner* — Michael G Lee
*Assistant Examiner* — Matthew Mikels
(74) *Attorney, Agent, or Firm* — Woodcock Washburn LLP

(57) ABSTRACT

Merchandise display systems for lighting control devices are disclosed. Such a display system may include one or more distinct lighting control devices, each having a respective user-manipulatable actuator, and a video display that presents a virtual lighting scene associated with a selected lighting control device. A lighting load may be connected to one or more of the lighting control devices. User manipulation of a selected actuator may simultaneously affect both the presentation of the virtual lighting scene and a light intensity level of the lighting load.

16 Claims, 6 Drawing Sheets

(56) References Cited

OTHER PUBLICATIONS

Quantum Green Glance, Show Your Company's Commitment to Sustainability and Reducing Carbon Emissions, Lutron, Nov. 2007, 3 pages.
Shedding Light on Control, AMX Inconcert with Lutron, 2006, 3 pages.
WattStopper, MRDS10 Wireless Touchscreen Controller, Legrand, www.wattstopper.com, Apr. 2005, 4 pages.
RadioRa Application Note, Lutron RadioRA 2 Way RS232 Operation with Philips Pronto TSU9600, Preliminary # 206, Lutron, Jul. 2007,10 pages.
Lutron Electronics Co., Inc., Energy WB, Lutron Home Page, http://www.lutron.com, Downloaded from Internet Dec. 29, 2008, FirstPorted Aug. 23, 2007, 1 pages.
U.S. Patent Specification in re:. U.S. Appl. No. 12/044,672, filed Mar. 7, 2008, Ian Rowbottom.

* cited by examiner

MERCHANDISE DISPLAY SYSTEMS FOR LIGHTING CONTROL DEVICES

BACKGROUND

Lighting control devices are offered for sale in retail stores. Examples of such lighting control devices include line-voltage devices, such as wallbox dimmers and plug-in lamp dimmers, as well as low-voltage devices, such as keypads.

To attract consumers to a particular brand of lighting control device, a retailer may employ a merchandise display system. Such a display system may include a product display containing a user-removable plurality of lighting control devices that are packaged for sale.

Such a display system may also include a lighting control device having a user-manipulatable actuator. The lighting control device may be connected to a lighting load. User manipulation of the actuator may affect the light intensity level of the lighting load.

Lighting control devices are also advertised on Internet-based web sites. Such a web site may present a "virtual" lighting control device, and a "virtual" lighting scene associated with the virtual lighting control device. Using a computer input device, such as a mouse or keyboard, a user can "manipulate" the virtual lighting control device.

User manipulation of the virtual lighting control device affects the virtual lighting scene. For example, such manipulation may cause the light intensity level of the virtual lighting scene to increase or decrease, or it may cause the website to present a different scene altogether.

To continue to attract prospective customers to a particular line of products, improved merchandise display systems for lighting control devices would be desirable.

SUMMARY

Described herein are merchandise display systems for lighting control devices that include one or more lighting control devices and a video display. Each lighting control device may include a respective user-manipulatable actuator, such as an on-off actuator or dimming actuator, for example. User manipulation of a selected one of the actuators may cause the video display to present a virtual lighting scene associated with the lighting control device comprising the selected actuator.

User manipulation of a selected actuator may also cause the video display to alter the virtual lighting scene. The video display may alter the virtual lighting scene by increasing or decreasing a light intensity level associated with the virtual lighting scene, or by causing the video display to present a different virtual lighting scene.

A lighting load may be connected to one or more of the lighting control devices. User manipulation of the actuator may simultaneously affect both the presentation of the virtual lighting scene and a light intensity level of the lighting load.

The display system may include a product display that contains a user-removable plurality of the lighting control devices. Each of the user-removable plurality of lighting control devices may be packaged for sale.

The display system may also include a display panel. The lighting control devices, the video display, and the lighting load may be mounted onto the display panel. The display panel may be inset into the product display.

The video display may also present product information or energy savings information associated with the lighting control device. User manipulation of the actuator may cause the video display to alter the energy savings information. The video display may present an image of the lighting control device.

DETAILED DESCRIPTION

Figure 1:
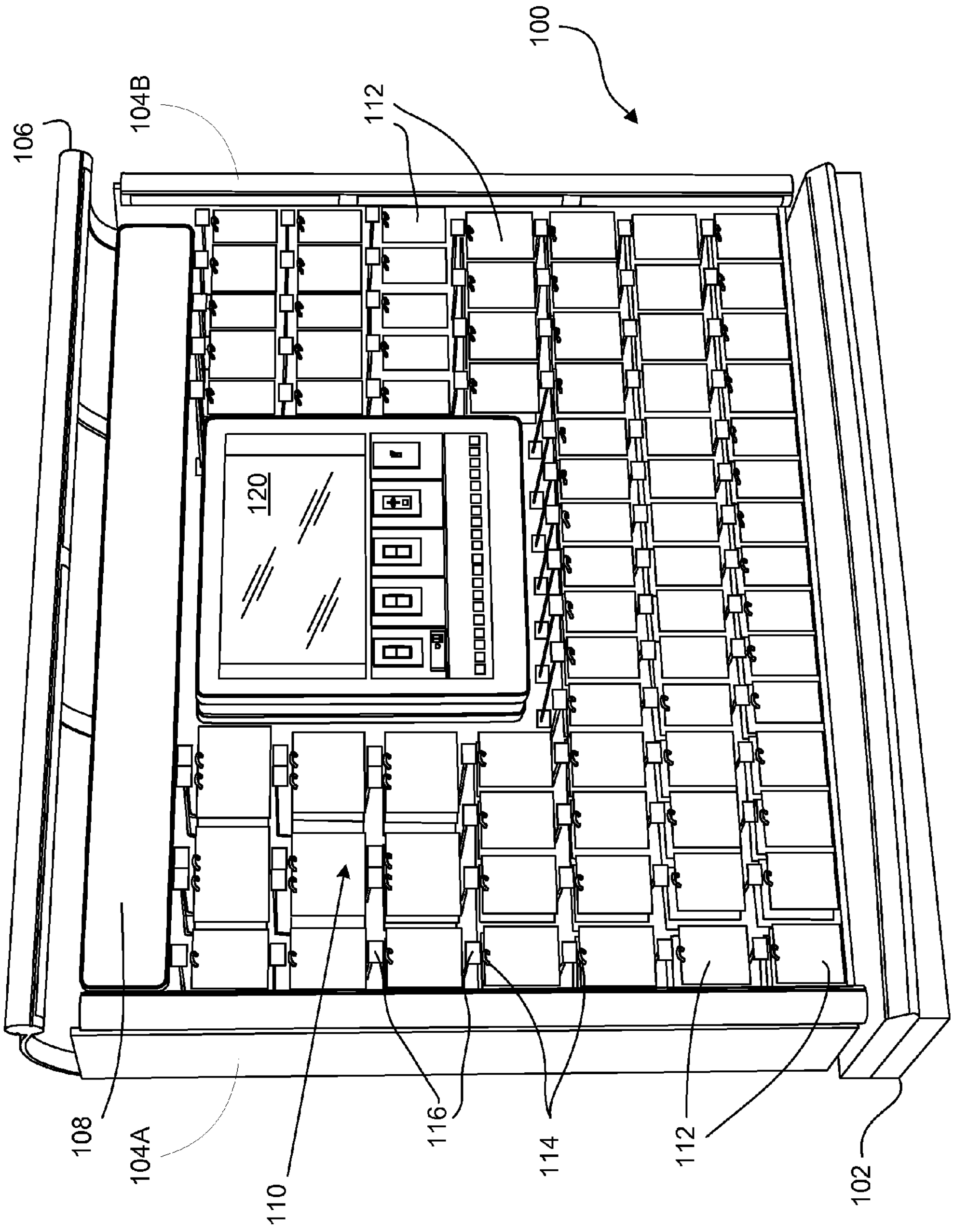
FIG. 1 depicts an example merchandise display system for lighting control devices.

FIG. 1 depicts an example merchandise display system 100 for lighting control devices. The display system 100 may be a standalone display system, having a base 102 and opposing side panels 104A, 104B extending from the base 102. The display system 100 may have a back panel (not seen in FIG. 1) extending from the base 102 between the side panels 104A and 104B. The display system 100 may include a light source 106, which may extend from the back panel, between the side panels 104A and 104B. The light source 106 may provide overall lighting in the area in front of the display system 100. The display system 100 may include a marquis 108, which may present advertising indicia, such as the name of the company offering the lighting control devices for sale, trademarks, slogans, or the like.

The display system 100 may include a product display 110 containing a user-removable plurality of lighting control devices 112. Each of the user-removable plurality of lighting control devices 112 may be packaged for sale. Any number of packaged lighting control devices 112 may be displayed. Any number of different types of lighting control devices 112 may be displayed.

The packaged lighting control devices 112 may be arranged in rows (left to right) and columns (top to bottom). The product display 110 may include a number of rails 114. A number of packaged lighting control devices 112 may be hung on a rail 114. A purchaser may remove one or more packaged lighting control devices 112 by sliding the packaged device(s) off of the rail 114. The product display 110 may also include a respective tag 116 associated with each of the of lighting control devices 112. The tags 116 may provide the prospective consumer with information about the lighting control devices 112 contained on that rail 114, such as the cost, product name, part number, etc. The tags 116 may be displayed on the rails 114.

Figure 2:
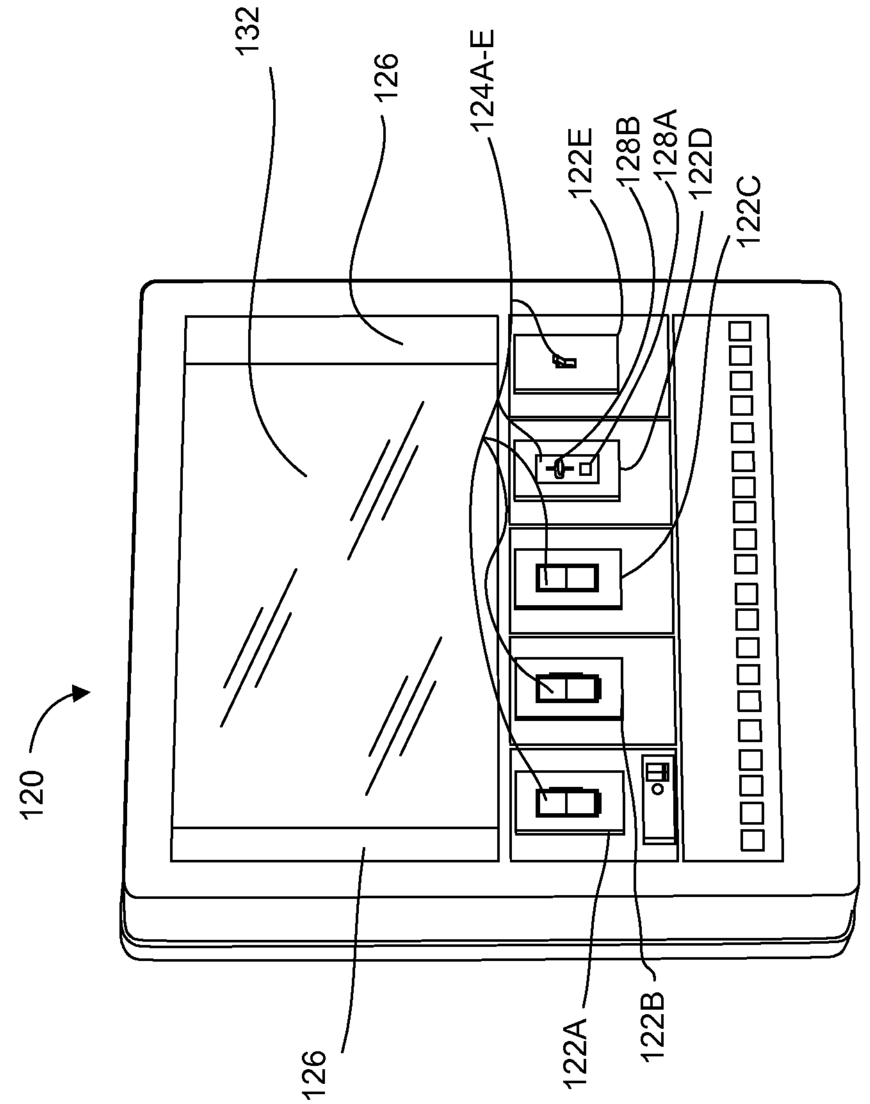
FIG. 2 depicts an example display panel for a merchandise display system for lighting control devices.

The display system 100 may include a display panel 120, which may be inset into the product display 110. FIG. 2 depicts an example display panel 120. A plurality of lighting control devices 122A-E may be mounted on the display panel 120. The lighting control devices 122A-E may be distinct from one another. That is, the lighting control devices 122A-E might be different types of lighting control devices, have different product names, etc.

Each of the lighting control devices 122A-E may include a respective user-manipulatable actuator 124A-E. Each of the user-manipulatable actuators 124A-E may be an on-off actuator, e.g., actuator 128A, that causes the light intensity level of an associated lighting load to toggle between an on state and an off state, or a dimming actuator, e.g., actuator 128B, that causes the light intensity level of an associated lighting load to vary incrementally between a preset minimum light intensity level and a preset maximum light intensity level.

The display system 100 may also include a video display 130, which may be mounted onto the display panel 120. The video display 130 may include a video display screen 132, which may be a liquid crystal diode (LCD) screen, for example. The display system may include a light surround 126, which may be a light source that at least partially surrounds the video display screen 132.

Figure 3:
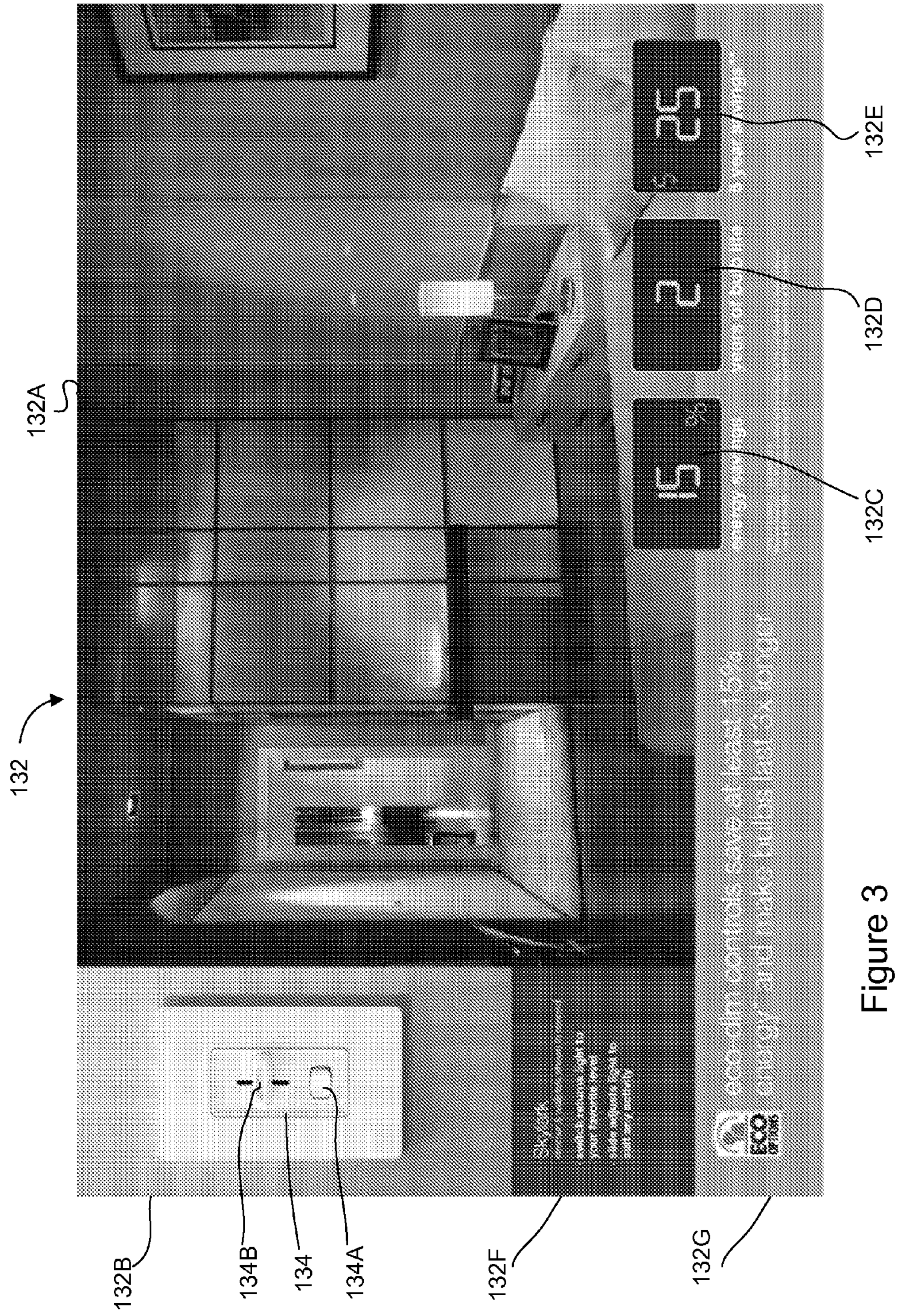
FIG. 3 depicts an example video display screen.

FIG. 3 depicts an example video display screen 132, which may be partitioned into one or more viewing areas 132A-G. The video display 130 may be adapted to present a respective virtual lighting scene associated with each of the lighting control devices 122A-E in one of the viewing areas, e.g., viewing area 132A. User manipulation of a selected one of the actuators 124A-E may cause the video display 130 to present the virtual lighting scene associated with the lighting control device 122A-E comprising the selected actuator 124A-E.

As shown in FIG. 3, a virtual lighting scene may include a depiction of a room, office, or other lighted area. The lighted area may include one or more “virtual” light sources, which may be presented on the screen as renderings of realistic light sources illuminating certain areas on the screen. The scene may be defined such that each virtual light source “illuminates” its associated area at a certain light intensity level relative to the light intensity levels of the other virtual light sources. In general, the virtual light sources may be presented at different intensity levels, though they may all be presented at the same intensity level.

Each virtual light source may be defined to have a respective maximum light intensity level and a respective minimum light intensity level. The scene may be presented at a relative light intensity level corresponding to the current state of the selected actuator. In other words, if the selected actuator is in a certain state between its minimum state and its maximum state, then each light source may be presented at a light intensity level corresponding to the same state between its preset minimum and maximum light intensity levels. For example, if a dimming actuator is set halfway between its maximum position (e.g., associated with fully-on) and its minimum position (e.g., associated with off), then each of the virtual light sources may be presented at a light intensity level that is halfway between its minimum and maximum light intensity levels.

User manipulation of the selected actuator may cause the video display to alter the virtual lighting scene. The video display may alter the virtual lighting scene by increasing or decreasing the light intensity level associated with the virtual lighting scene. The video display may alter the virtual lighting scene by presenting a different virtual lighting scene.

If the virtual lighting scene currently being presented is associated with the selected lighting control device, then manipulation of the selected actuator may affect the light intensity level of the scene. If the currently-presented scene is not associated with the selected lighting control device, then manipulation of the selected actuator may cause the video display to present a different scene, i.e., the scene associated with the selected lighting control device.

The video display may present an image 134 of the selected lighting control device in a second viewing area, e.g., viewing area 132B. In response to manipulation of the selected lighting control device, the display system may cause the presented image of the selected device to mimic the behavior of the real device. For example, if a user were to move a dimmer slider on the selected lighting control device, the display system may cause the video display to present an image of the selected device with the dimmer slider 134B moving in concert with the real dimmer slider. Similarly, if a user were to toggle an on-off actuator on the selected lighting control device, the display system may cause the video display to present a virtual toggling on-off actuator 134A of the image.

The video display may present energy savings information associated with the lighting control device in a third viewing area, e.g., viewing area 132C. The energy savings information may be a function of the state of the dimming actuator or the on-off actuator. For example, energy savings information could be computed as a function of the ratio of the amount of energy that would be consumed at the selected light intensity level relative to the amount of energy that would be consumed if the lighting were undimmed. User manipulation of the actuator may cause the video display to alter the energy savings information. For example, as the user manipulates the actuator in a manner that corresponds to increases or decreases in light intensity level, the video display may alter the presented energy savings information to show less or more energy savings. The energy savings information may be presented as a percent of energy saved (e.g., as shown in viewing area 132C), as an extension of bulb life (e.g., as shown in viewing area 132D), and/or as a savings in cost (e.g., as shown in viewing area 132E).

The video display may also present product information associated with the selected lighting control device. As depicted in viewing areas 132F and 132G, such product information may include, for example, a description of the features and functions provided by the selected lighting control device.

The display system 100 may also include a real lighting load connected to one or more of the lighting control devices. The real lighting load may include the light source 106, described above in connection with FIG. 1, that provides overall lighting in the area in front of the display system 100, or the light surround 126, described above in connection with FIG. 2. The real lighting load may include any number of lamps or light sources.

User manipulation of a selected actuator may affect the light intensity level of the real lighting load. For example, the display system may cause the light intensity level of the real lighting load to correspond to the current state of the selected actuator. Accordingly, because the light intensity level of the virtual lighting scene presented by the video display also corresponds to the current state of the selected actuator, the light intensity level of the real lighting load may correspond to the virtual lighting scene presented by the video display. Thus, user manipulation of a selected actuator may simultaneously affect both the presentation of the virtual lighting scene and the light intensity level of the real lighting load.

Figure 4:
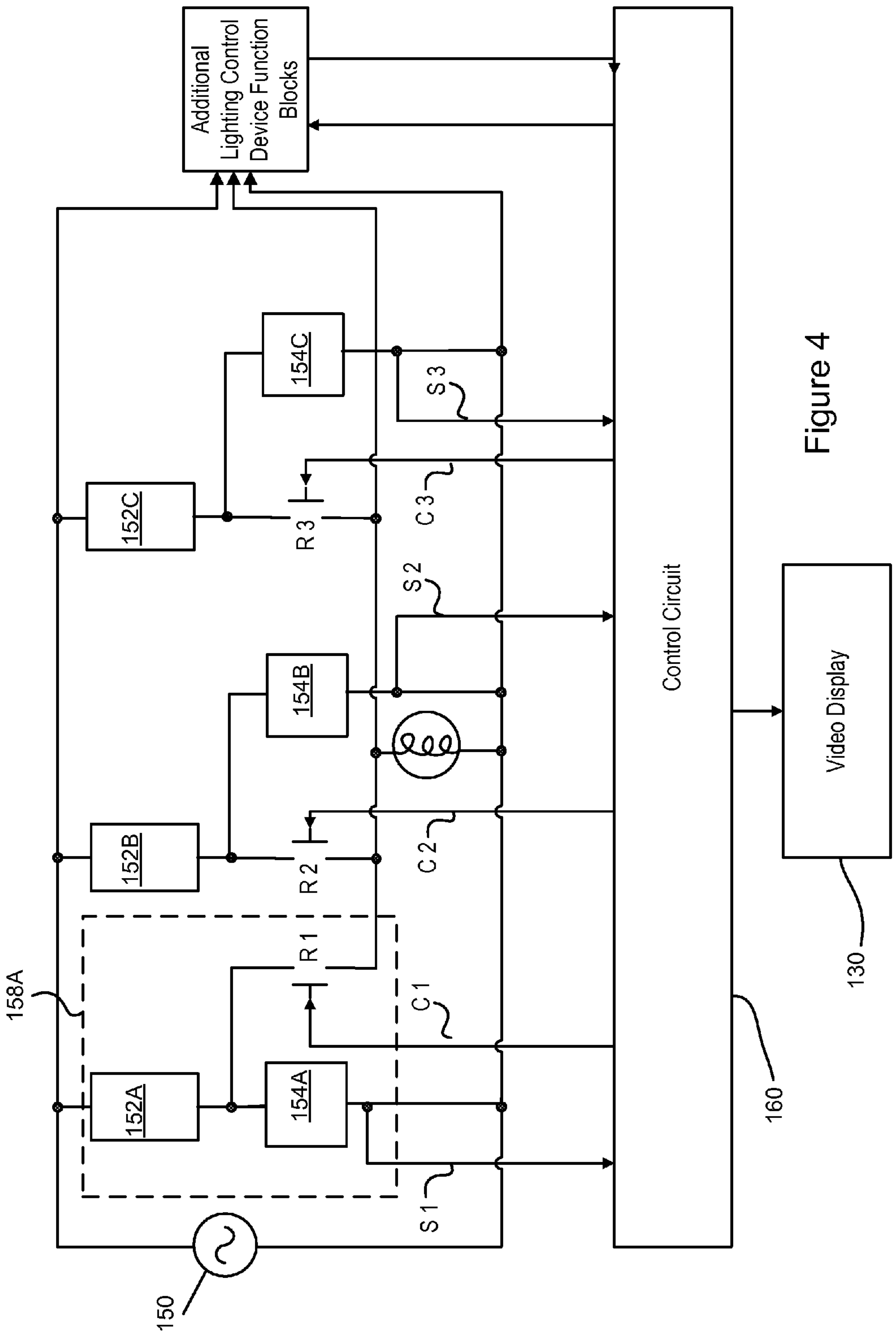
FIG. 4 is a schematic diagram of an example merchandise display system for lighting control devices.

FIG. 4 is a schematic diagram of an example merchandise display system for lighting control devices. The system may include a plurality of lighting control devices 152A-C, each of which may be any type of lighting control device, such as, for example, lighting control devices 122A-E depicted in FIGS. 1 and 2. Each of the one or more lighting control devices 152A-C may be coupled to an AC voltage source 150.

Each lighting control device 152A-C may be coupled to a respective corresponding load box 154A-C and relay R1-3. The load boxes 154A-C may be resistive load boxes, such as synthetic minimum loads (e.g., Lutron Electronics Co, Inc., part number LUT-LBX-WH). As shown, a lighting control function block 158A may be defined to include an associated lighting control device 152A, load box 154A, and relay R1. For each lighting control device 152A-C, the system may have a corresponding lighting control function block of similar elements.

Each of the lighting control devices 152A-C may be operable to produce a phase-controlled voltage in response to user manipulations of its associated dimming actuator. The control circuit 160 may be operable to monitor the phase-controlled voltages produced by the lighting control devices 152A-C. For example, the control circuit 160 may monitor the phase-controlled voltages produced by the lighting control devices 152A-C by monitoring the currents flowing through the load boxes 154A-C via sensing inputs S1-S3. By monitoring the current flowing through the load box 154A, for example, the control circuit 160 can determine whether the lighting control device 152A was actuated. If there is a change in the current flowing through the load box 154A, then lighting control device 152A was actuated. The control circuit 160 can also determine the nature of the actuation (e.g., raise/lower, toggle, etc.) by measuring the amount of current.

The control circuit 160 may be coupled to the video display 130. The control circuit 160 may update the video display 130 with information related to a selected device 152A-C. Further, because the control circuit 160 measures the current flowing through the load boxes 152A-C, the control circuit 160 can update the virtual lighting scene being presented by the video display, and can provide appropriate energy savings information to correspond with the measured current.

Additionally, upon determining that a selected device 152A-C was actuated, the control circuit 160 can control the corresponding relay 156A-C via the corresponding control output C1-C3. When the control circuit 160 senses that a selected device 152A-C has been actuated, the control circuit 160 may close the corresponding relay 156A-C, thereby directly coupling the selected device 152A-C to the real lighting load. The real lighting load would then be responsive to the phase controlled voltage of the selected device 152A-C. Thus, the light intensity level of the real lighting load can also change in response to user actuations of a selected device 152A-C.

If the user were to begin actuating a different device 152A-C, the control circuit 160 would sense the current flowing through the load box corresponding to the newly-selected device 152A-C via its corresponding sensing input S1-S3. The control circuit 160 would then update the video display with information related to the newly-selected device 152A-C. The control circuit 160 would also open the relay 156A-C corresponding to the previously-selected device 152A-C via the control output C1-C3 corresponding to the previously-selected device 152A-C, and close the relay 156A-C corresponding to the newly-selected device 152A-C via the control output C1-C3 corresponding to the newly-selected device 152A-C. Thus, the real lighting load would be made responsive to the phase-controlled voltage of the newly-selected device 152A-C.

The control circuit 160 may also be operable to directly control the intensity of the real lighting load with its own phase-controlled voltage (not shown in FIG. 4).

Figure 5:
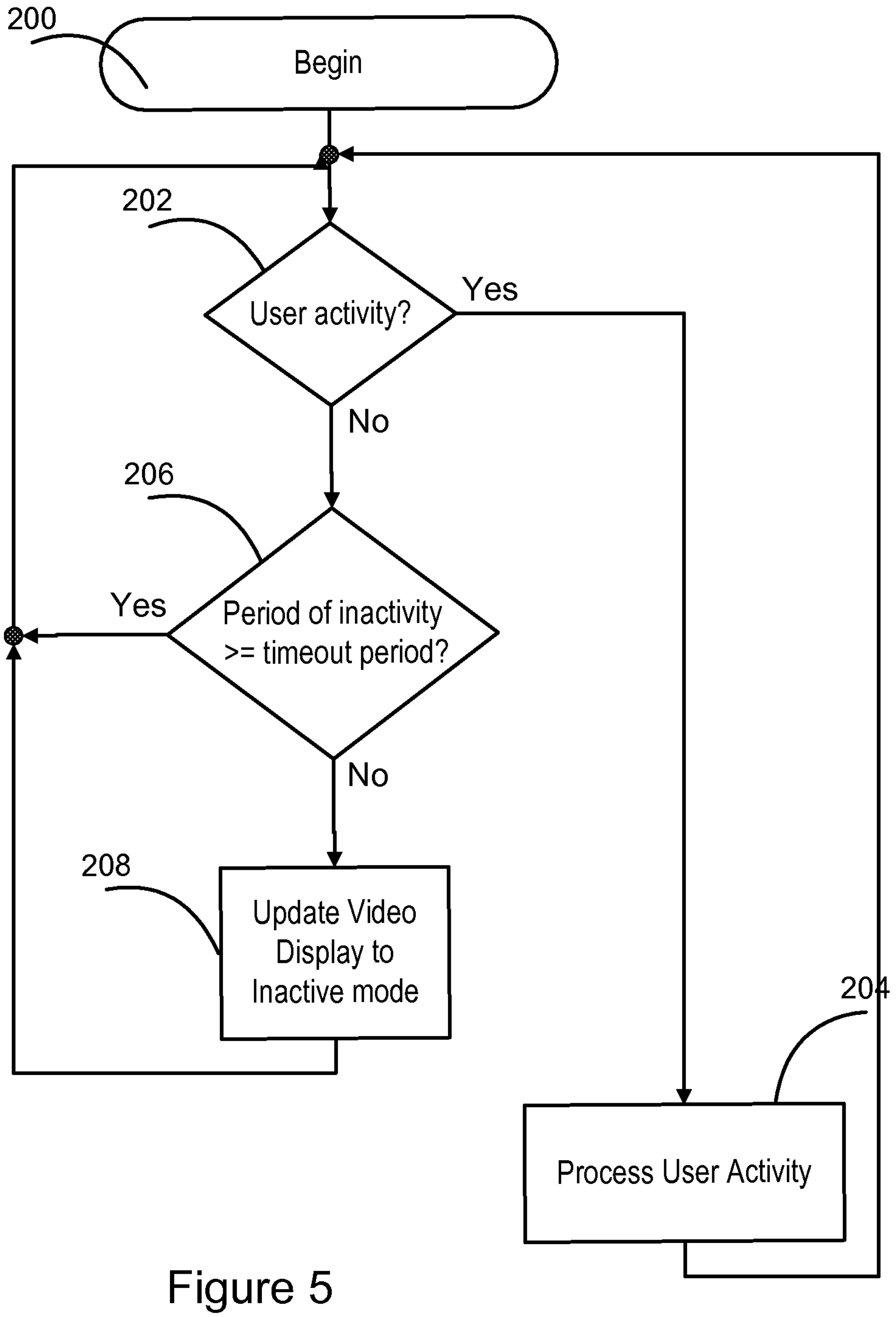
FIGS. 5 and 6 are flowcharts of an example method for controlling a merchandise display system for lighting control devices.
Figure 6:
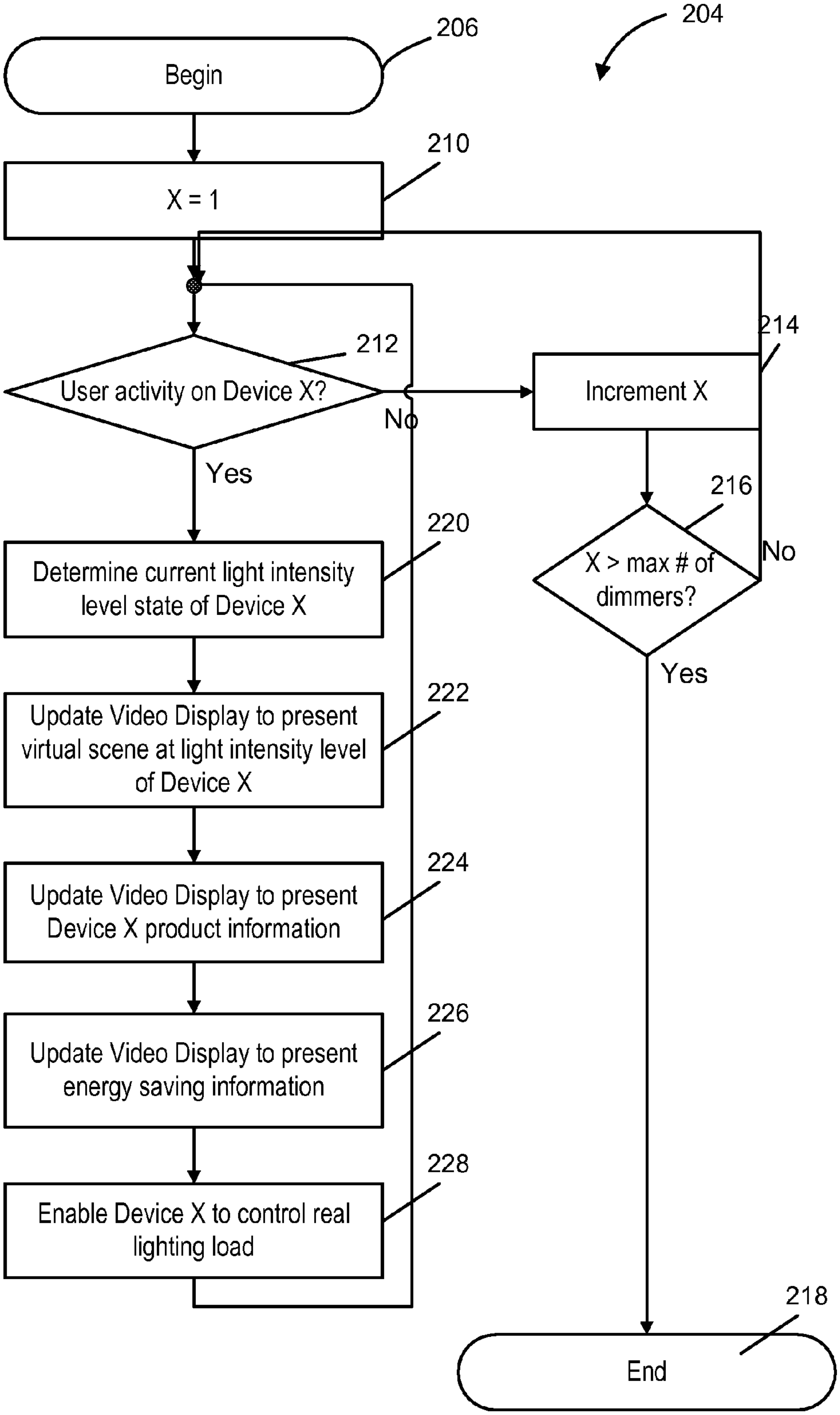

FIGS. 5 and 6 are flowcharts of an example method for controlling a merchandise display system for lighting control devices. FIG. 5 is a flowchart of a method 200 for inactivating the merchandise display 100 in the absence of user activity. At 202, the system detects whether any user activity has occurred. User activity may be, for example, a user manipulating one or more of the lighting control devices. The system is operable to detect whether any of the actuators has been manipulated by monitoring the current via sensing inputs S1-3. If, at 202, the system detects that a selected one of the actuators has been manipulated then, at 204, the user activity is processed. Once the user activity has been processed at 204, the system continues to detect user activity.

If, at 202, the system does not detect user activity, then, at 206, the system determines whether the period of inactivity, i.e., the time since the last detection of user activity, is greater than or equal to a predefined timeout period. The timeout period may be measured in seconds. If, at 206, the system determines that the period of inactivity is less than the timeout period, then the system continues to cycle, through 202 and 204, awaiting either a detection of user activity or for the period of inactivity to reach the timeout period.

If, at 206, the system determines that there has been no user activity for the timeout period, then, at 208, the system may cause the video display to go into "inactive" mode. For example, the video display may go into a power-saving mode, wherein nothing is displayed on the LCD. Alternatively, the video display may display a preprogrammed image or sequence of images when the display is in inactive mode. The system may remain in inactive mode until user activity is detected at 202.

FIG. 6 is a flow chart of a method 204 for processing user activity at a selected one of the manipulatable lighting control devices. As described above, the merchandise display system 100 may provide any number, N, of user-manipulatable lighting control devices. The method 204 may be performed simultaneously for all N lighting control devices, or sequentially, for one device at a time.

In a sequential method, as depicted in FIG. 6, a variable, X, may be initialized, at 210, to an initial value, e.g., one, that corresponds to a specific one of the N lighting control devices (e.g., the "first" lighting control device). At 212, the system detects whether there has been any user activity on the lighting control device corresponding to the variable X (e.g., the "first" lighting control device). This user activity may be sensed via a sensing input S1-3.

If, at 212, the system determines that there has been no activity on the Xth lighting control device, then, at 214, the variable X is incremented, and the system goes back to 212 to determine whether there has been any activity on the $(X+1)^{st}$ (the "next") lighting control device. If, at 216, the system determines that the value of the variable X does not exceed the number N of lighting control devices in the system, then the control process returns to step 212, cycling through the lighting control devices to detect activity on a selected one of them.

If, at 212, the system determines that there has been activity on the Xth lighting control device, then at 220, the system determines the light intensity level corresponding to the current state of the selected actuator by measuring the current via sensing inputs S1-3.

At 222, the system causes the video display to present a virtual scene associated with the selected lighting control device. The scene may include a virtual depiction of a room, office, or other lighted area. The lighted area may include one or more virtual light sources. The scene may be defined such that each light source is at a certain intensity level relative to the light intensity levels of the other light sources. All light sources may be at the same intensity level, or they may, in general, be at different intensity levels.

The scene may be presented at the light intensity level corresponding to the current state of the selected actuator. For example, if the current state of the selected actuator is a certain percentage of fully-on (say, 50%) then each light source may be presented at that percentage of its maximum intensity level.

At 224, the system may cause the video display to present product information associated with the selected lighting control device, as described above in connection with FIG. 3. At 226, the system may cause the video display to present energy information associated with the selected lighting control device, as described above in connection with FIG. 3. At 228, the system enables the selected lighting control device to control the real lighting load to which it is connected, as described above in connection with FIG. 4.

The control system then returns to 212 to determine whether there is continued user activity on the selected lighting control device, or on another lighting control device. If at 216, the system determines that the value of the variable X exceeds the number N of the lighting control devices in the system, then the control process exits at 218.

What is claimed:

1. A merchandise display system comprising:

a plurality of lighting control devices, each lighting control device comprising a respective user-manipulatable actuator, wherein each user-manipulatable actuator comprises at least one of an on-off actuator or a dimming actuator;

a lighting load connected to the lighting control devices; and a video display that presents a virtual lighting scene associated with a first lighting control device of the plurality of lighting control devices, the virtual lighting scene separate from the lighting load, wherein user manipulation of a first actuator of the first lighting control device affects a lighting intensity of the lighting load and causes the video display to alter the virtual lighting scene, wherein user manipulation of a second actuator of a second lighting control device causes the video display to present a second virtual lighting scene associated with the second lighting control device.

2. The display system of claim 1, wherein user manipulation of the first actuator of the first lighting control device causes the video display to alter the virtual lighting scene presented by the video display by increasing a light intensity level associated with the virtual lighting scene.

3. The display system of claim 1, wherein user manipulation of the first actuator of the first lighting control device causes the video display to alter the virtual lighting scene presented by the video display by decreasing a light intensity level associated with the virtual lighting scene.

4. The display system of claim 1, wherein user manipulation of the first actuator of the first lighting control device causes the video display to alter the virtual lighting scene by causing the video display to present a different virtual lighting scene.

5. The display system of claim 1, further comprising a display panel, wherein the lighting control devices and the video display are mounted onto the display panel.

6. The display system of claim 5, further comprising a product display containing a user-removable plurality of the lighting control devices.

7. The display system of claim 6, wherein each of the user-removable plurality of lighting control devices is packaged for sale.

8. The display system of claim 6, wherein the display panel is inset into the product display.

9. The display system of claim 1, wherein the light intensity level of the lighting load corresponds to the virtual lighting scene.

10. The display system of claim 1, wherein the video display presents product information associated with the first lighting control device in response to user manipulation of the first actuator.

11. The display system of claim 1, wherein the video display presents energy savings information associated with the first lighting control device.

12. The display system of claim 11, wherein the user manipulation of the first actuator of the first lighting control device causes the video display to alter the energy savings information.

13. The display system of claim 1, wherein the video display presents an image of the first lighting control device.

14. The display system of claim 1, wherein the virtual lighting scenes each comprise one or more virtual light sources, each of the one or more virtual light sources configured to depict illumination of an associated area presented on the video display.

15. The display system of claim 1, wherein user manipulation of the second actuator of the second lighting control device affects the light intensity level of the lighting load.

16. The display system of claim 10, wherein the video display presents product information associated with the second lighting control device in response to user manipulation of the second actuator.

* * * * *